(12) United States Patent
Halter

(10) Patent No.: US 8,763,540 B2
(45) Date of Patent: Jul. 1, 2014

(54) METHOD FOR INJECTING A SUBSTANCE INTO A BOILER OF A WASTE INCINERATION PLANT

(75) Inventor: Roland Halter, St. Gallen (CH)

(73) Assignee: Hitachi Zosen Inova AG, Zurich (CH)

(*) Notice: Subject to any disclaimer, the term of this patent is extended or adjusted under 35 U.S.C. 154(b) by 936 days.

(21) Appl. No.: 12/564,032

(22) Filed: Sep. 21, 2009

(65) Prior Publication Data

US 2010/0058962 A1    Mar. 11, 2010

Related U.S. Application Data

(63) Continuation-in-part of application No. 12/489,346, filed on Jun. 22, 2009.

(30) Foreign Application Priority Data

Jun. 23, 2008  (EP) .................................. 08011324

(51) Int. Cl.
  *B01D 53/14* (2006.01)
  *F23N 5/02* (2006.01)
  *F23G 5/00* (2006.01)

(52) U.S. Cl.
  USPC ........................... 110/345; 215/190; 215/309

(58) Field of Classification Search
  USPC ......... 110/203, 185, 186, 188, 190, 235, 297, 110/301, 309, 313, 344, 348; 423/235, 237, 423/238; 431/4, 12
  See application file for complete search history.

(56) References Cited

U.S. PATENT DOCUMENTS

| 5,098,680 | A  | * | 3/1992 | Fellows et al. ................. 423/235 |
| 5,237,939 | A  | * | 8/1993 | Spokoyny et al. ............ 110/345 |
| 5,988,115 | A  |   | 11/1999 | Anderson et al. |
| 7,729,566 | B2 | * | 6/2010 | Sappey et al. .................... 385/13 |
| 7,736,608 | B2 | * | 6/2010 | Eiteneer et al. ............ 423/239.1 |
| 7,910,494 | B2 | * | 3/2011 | Dip et al. ....................... 431/174 |
| 2009/0047199 | A1 | * | 2/2009 | Arrol et al. .................... 423/210 |

FOREIGN PATENT DOCUMENTS

| DE | 86 12 710 | 9/1986 |
| DE | 37 22 523 | 6/1988 |
| DE | 41 39 862 | 6/1993 |
| DE | 44 34 943 | 4/1996 |

(Continued)

OTHER PUBLICATIONS

EPO English Translation for DE 86 12 710.

(Continued)

*Primary Examiner* — Kenneth Rinehart
*Assistant Examiner* — David J Laux
(74) *Attorney, Agent, or Firm* — Abe Hershkovitz; Hershkovitz & Associates, PLLC

(57) ABSTRACT

A method is provided for injecting a substance into a boiler of a waste incineration plant using a gaseous propellant, the substance being conducted, starting from at least one distributor, via lines which branch off from the distributor, in each case to a nozzle which is assigned to the respective line and by means of which the substance and the propellant are injected into the boiler. The substance quantity to be conducted to the respective nozzle is set in the distributor. The boiler is subdivided into multiple boiler sectors, in which the nozzles are arranged in a plurality of horizontal nozzle planes. To each boiler sector at least one separate distributor is assigned. The substance and the propellant are combined upstream of the branch-off with the respective line.

13 Claims, 3 Drawing Sheets

(56) References Cited

FOREIGN PATENT DOCUMENTS

Figure 1:
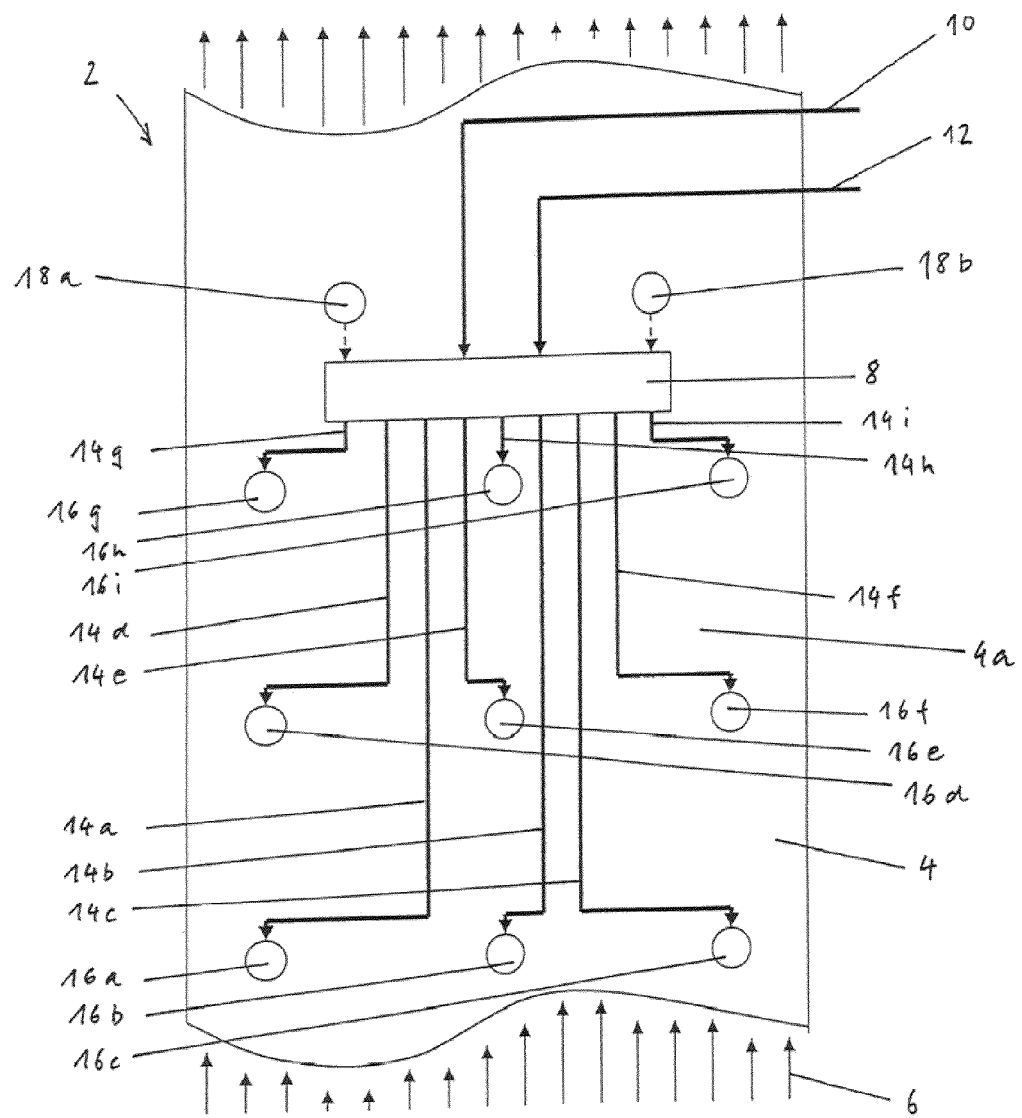

| DE | 20 2006 013 152 | 12/2006 |
|---|---|---|
| EP | 0 364 712 | 4/1990 |
| JP | S 52-8974 A | 1/1977 |
| JP | S 60-216828 A | 10/1985 |
| JP | H0 4-34903 A | 2/1992 |
| JP | 2000-274638 A | 10/2000 |
| JP | 2005-308362 A | 11/2005 |
| WO | WO 91/06506 | 5/1991 |
| WO | WO 91/17814 | 11/1991 |
| WO | WO 2006/053281 | 5/2006 |

OTHER PUBLICATIONS

European Search Report mailed Mar. 4, 1999, in EP 08 01 1324.
Heide, Bernd von der, Best Available Technology for NOx Reduction in Waste to Energy Plants, SNCR Process, Jun. 3-5, 2008, pp. 1-21, Mehldau & Steinfath Umwelttechnik GmbH.
English Abstract of JPS 60-216828.
English Abstract of JPH0 4-34093.
English Abstract of JPS 52-8974.
English Abstract of JP 2005-308362.
English Abstract of JP 2000-274638.

* cited by examiner

METHOD FOR INJECTING A SUBSTANCE INTO A BOILER OF A WASTE INCINERATION PLANT

This is a Continuation-In-Part Application of U.S. application Ser. No. 12/489,346 filed Jun. 22, 2009, pending, which is incorporated herein by reference in its entirety.

The present invention relates to a method for injecting a substance into a boiler of a waste incineration plant, and to an apparatus for carrying out the method.

Generic methods are used, for example, for the selective non-catalytic reduction (SNCR) of gaseous nitrogen oxides ($NO_x$), such as occur, for example, in waste incineration. Such SNCR methods are described, for example, in DE-A-4139862 and in WO 2006/053281.

In the SNCR methods, conventionally, reducing agents are injected in aqueous solution (for example, ammonia water or urea) or in gaseous form (for example, ammonia) into the hot flue gases flowing through the boiler, in order to reduce nitrogen oxides into molecular nitrogen according to the following equations.

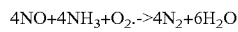

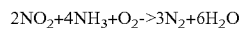

The optimal temperature range in this case lies approximately between 850° C. and 950° C., depending on the composition of the flue gas. The corresponding region of the boiler is also designated as the post-combustion chamber.

Above the optimal temperature range, ammonia is increasingly oxidized, nitrogen oxides occurring, which results in an undesirable extra consumption of ammonia. Below this temperature range, only an inadequate reduction of nitrogen oxides takes place.

In order to remove nitrogen oxides efficiently from the flue gas, it is therefore necessary to inject ammonia into the boiler primarily where the optimal temperature range is present.

Accordingly, for example, WO 91/17814 discloses a method whereby an agent for the reduction of pollutants is injected into a flue gas passage at a temperature at which the pollutants are effectively reduced. In this case, the nozzles are arranged in different zones distributed over the height.

Alternatively to this, DE-C-3722523 proposes a nozzle arrangement on a vertically displaceable lance rack, via which the location for the supply of ammonia can be adapted.

However, a further obstacle in the way of an efficient reduction of nitrogen oxides is that the temperature at the individual points in the boiler is usually non-uniform and is subject to pronounced time fluctuations.

In this regard, DE-A-4434943 discloses a method in which the temperature level optimal for reduction in the boiler is determined by temperature sensors, and the nozzles for supplying the reducing agent are oriented correspondingly.

In practice, however, an optimal reduction in the nitrogen oxides is possible only when the quantity of reducing agent to be supplied can be set individually for each nozzle, in order to take the local temperature differences in the boiler into account.

In this regard, DE 20 2006 013 152 discloses a line arrangement for a plurality of atomizer lances on a boiler, through which line arrangement an additive is supplied to the boiler. In this case, the supply quantity of the additive is set for each atomizer lance in a distributor.

All the nozzles or lances of the above-listed documents of the prior art are what are known as two-component nozzles or two-component lances.

Thus, for example, in the arrangement described in DE 20 2006 013 152, the additive and the pressure medium are intermixed, immediately before being supplied to the boiler, in a connection piece assigned to the atomizer lance, thus allowing a mutually independent metering of the propellant and of the additive.

Since each individual two-component lance or two-component nozzle has a specific supply for the additive and a specific supply for the compressed air, however, they have a relatively complicated design. Moreover, two-component lances or two-component nozzles possess relatively large dimensions, thus making it difficult to install them in the boiler of an incineration plant.

If, as is customary in the SNCR methods, ammonia is injected, in the systems based on two-component nozzles the ammonia is present, as a rule, in a highly diluted solution in the form of ammonia water, in order to ensure a uniform distribution of the ammonia to the individual two-component nozzles. For this purpose, softened water is generally used, in order to minimize lime deposits in the nozzle or in the liquid line leading to the latter.

As well as the high outlay involved in the central dilution of ammonia with softened water, systems based on two-component nozzles often have the disadvantage that control is sluggish, that is to say temperature changes in time in the boiler can be reacted to only after pronounced delay. In particular, as a rule, the known systems do not make it possible to react appropriately to brief temperature peaks in the boiler.

The object of the present invention, therefore, is to make available a simple method for injecting a substance, in particular a reducing agent for the reduction of nitrogen oxides, into a boiler of a waste incineration plant, which method makes it possible to set the desired substance quantity in a directed manner for individual injection points and to adapt this setting quickly.

In particular, the method is to make it possible, at as low outlay as possible in terms of apparatus, in SNCR methods to ensure an optimal reduction of the nitrogen oxides, along with a minimal consumption of reducing agent, while taking into account both the local temperature differences and the temperature changes in time in the boiler.

The object is achieved, according to the invention, by means of the method of claim 1. Advantageous embodiments are listed in the dependent claims.

According to claim 1, the substance to be injected is conducted, starting from at least one distributor, via lines which branch off from the distributor, in each case to a nozzle assigned to the respective line. The substance quantity to be conducted to the respective nozzle is set in the distributor. The boiler, into which the substance and the propellant are injected, is subdivided into multiple boiler sectors, in which the nozzles are arranged in a plurality of horizontal nozzle planes. To each boiler sector at least one separate distributor is assigned.

Since, according to the invention, the substance to be injected and the propellant are combined before the respective line branches off from the distributor, a mixture containing the substance and the propellant is present before the branch-off. Consequently, structurally simple and robust one-component nozzles can be used, such as are described, for example, in EP-A-0 364 712, the content of which is hereby incorporated by reference.

It has been assumed hitherto that a setting of the substance quantity to be injected can be implemented for each individual nozzle only by using two-component nozzles.

It was found, then, surprisingly, that it is possible, even using one-component nozzles, to set individually for each nozzle the substance quantity which is to be injected.

The method of the present invention is used primarily for the abovementioned SNCR methods. As a rule, the substance to be injected is therefore a reducing agent for the reduction of nitrogen oxides, in particular ammonia or urea.

The invention makes it possible for the quantity of reducing agent to be injected to be set individually for each nozzle as a function of the temperature profile prevailing in each case in the boiler. What can thereby be ensured is that the reducing agent is injected, in accordance with the main emphasis, where the temperature range optimal for reduction is present. The result of this is that, in the case of a high reduction rate of the nitrogen oxides, the drift and therefore too the consumption of reducing agents are minimized, this resulting, overall, in a highly economical and ecological type of operation.

Due to the fact that to each boiler sector at least one separate distributor is assigned, the length of the respective lines can be shortened allowing for a very quick adaptation of the desired substance quantity for each injection point.

According to one embodiment of the invention, in the event of a change in the setting of the substance quantity to be conducted to the respective nozzle, this change is carried out in an infinitely variable manner, that is to say continuously.

In general, the nozzles are arranged in a plurality of, preferably at least three horizontal nozzle planes (hence oriented, as a rule, transverse to the direction of flow of the flue gas). According to the above embodiment of the method, the substance quantity to be injected can be displaced infinitely variably from a first nozzle plane to a further nozzle plane, that is to say it is reduced infinitely variably in a first horizontal nozzle plane and is simultaneously raised infinitely variably to a further horizontal nozzle plane. This makes it possible, in the case of SNCR methods, to react optimally to temperature fluctuations in time, which is not possible in the case of an abrupt nozzle plane changeover and the undefined transitional states of this type occurring at the same time.

The invention makes it possible, further, to carry out infinitely variable change or displacement very quickly. This made possible, inter alia, in that, in the method according to the invention, a central dilution of the substance, such as is carried out, for example, in the SNCR methods based on two-component nozzles, is not necessary. The present invention thus makes it possible to react appropriately even to brief temperature changes.

As a rule, in this case, the overall quantity of reducing agent to be injected is regulated as a function of the nitrogen oxide content, present downstream of the boiler, in the flue gas. For this purpose, means for determining the nitrogen oxide content are arranged downstream of the boiler. The nitrogen oxide content determined in this case is compared with a predetermined desired value in order to regulate the required overall quantity of reducing agent.

In order to ensure as high a nitrogen oxide reduction rate as possible, along with a minimal consumption of reducing agent, the quantity of reducing agent to be conducted to the respective nozzle is regulated, as a rule, as a function of the temperature profile in the boiler. It can thus be ensured that the reducing agent is injected, as the main emphasis, where the temperature range optimal for reduction prevails.

To determine the temperature profile, in principle, any temperature measuring apparatus suitable for this purpose may be considered. Appropriate temperature measuring apparatuses are known to a person skilled in the art. Particularly preferably, the temperature measuring apparatuses used are what are known as radiation pyrometers which allow an exact measurement of the gas temperature.

The temperature gradient falling in the direction of flow of the flue gas can be determined by means of an algorithm known to a person skilled in the art. Thus, by the temperature at a defined point being determined, the temperature profile prevailing in the boiler can be determined in the direction of flow.

Moreover, by the temperature at a further point being determined, it is possible also to determine the temperature profile transversely to the direction of flow via interpolation between the two temperature points. The determination of the temperature at two different points thus makes it possible to determine the overall temperature profile in two dimensions. Accordingly, the temperature profile in the boiler is determined particularly preferably by means of at least two temperature measuring apparatuses. According to a preferred embodiment, to each distributor one temperature measuring apparatus is assigned. It is also conceivable, for example, that at least two temperature measuring apparatuses are provided per distributor.

The quantity of reducing agent locally required depends, moreover, on the local flow velocity, since more reducing agent is required in the case of high flow velocity than in the case of a low flow velocity. In this regard, it is conceivable that the quantity of reducing agent to be conducted to the respective nozzle is additionally regulated as a function of the flow velocity distribution of the flue gas in the boiler. In this case, as a rule, it is sufficient to determine the flow velocity once only.

According to the invention, the setting of the reducing agent quantity to be conducted to the individual nozzles takes place in the respective distributor. In concrete terms, the metered reducing agent is supplied to the propellant stream, specifically, according to the invention, upstream of the branch-off of the line leading to the respective nozzle. Thus, upstream of the branch-off, a mixture containing the propellant and the reducing agent is therefore present.

Furthermore, as a rule, a distribution of the propellant quantity takes place. In this case, in general, a first propellant quantity is set for the nozzles acted upon by the reducing agent, while, for the nozzles not acted upon by the reducing agent, a second propellant quantity is set for cooling the nozzles.

In this case, for distribution, the means known to a person skilled in the art which are suitable for the corresponding purposes may be considered. For example, the quantity of reducing agent or of propellant may be set by means of regulating valves.

As given above, the mixing of the reducing agent and the propellant as well as the distribution to the respective line take place in the distributor. In general, the mixing and the distribution take place approximately at the same time. Thus, the branch-off can also be considered a part of the distributor.

The reducing agent is preferably present in aqueous solution. In the case of dissolved ammonia, ammonia water is therefore referred to. Preferably, for example, a commercially available ammonia solution is used, for example a 25% ammonia solution. However, any other solution may also be envisaged which releases ammonia at temperatures prevailing in the boiler, for example a solution containing an ammonium salt, such as ammonium carbonate, ammonium formate and/or ammonium oxalate.

The propellant used is preferably air or steam.

If the propellant used is, for example, air, the ammonia water to be injected is atomized into droplets when being fed into the air stream and immediately thereafter is distributed to the individual nozzles or to the respective lines leading to the nozzles. Any coalescing droplets are atomized again in the nozzle through which the flow passes at sound velocity.

In the nozzles acted upon by the ammonia water, as a rule, a nozzle admission pressure of approximately 1 to 5 bar is set, so that the ammonia water or the ammonia evaporating out in the boiler can penetrate sufficiently far into the flue gas stream. Those nozzles which are not in operation, that is to say not acted upon by ammonia water, have a smaller air quantity flowing through them for cooling purposes. Thus, upstream of the branch-off of the lines leading to the respective nozzles, a first air stream is set for the nozzles acted upon by the ammonia water, while a further air stream lower than the first air stream is set for those nozzles which are not in operation.

The lines branching off from the respective distributor and leading to the respective nozzles are, as a rule, in the form of pipes, such as are known to a person skilled in the art for the corresponding purposes. The nozzles used may, for example, be circular-jet nozzles or fan nozzles, further suitable nozzles being known to a person skilled in the art. In particular, an alternating arrangement of circular-jet nozzles with fan nozzles may be envisaged.

In general, the boiler sectors, into which the boiler is subdivided, extend vertically. It is thereby preferred that in each boiler sector, one nozzle is arranged on each horizontal nozzle plane. It is further preferred that one distributor is assigned to each boiler sector. Thus, the method of the present invention can be carried out in a straightforward manner using a relatively simple distributor.

According to a further preferred embodiment, the boiler is subdivided into two to twenty boiler sectors, more preferably four boiler sectors. It is further preferred that the nozzles are arranged on three horizontal nozzle planes. Thereby, optimal reduction of the nitrogen oxides, along with a minimal consumption of reducing agent, can be achieved.

Figure 2:
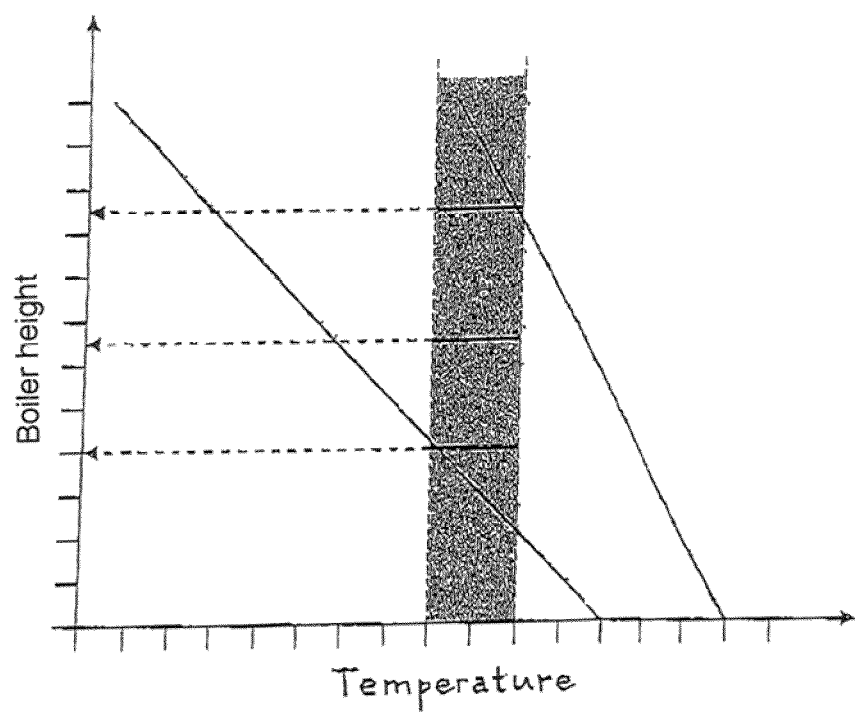
Figure 3:
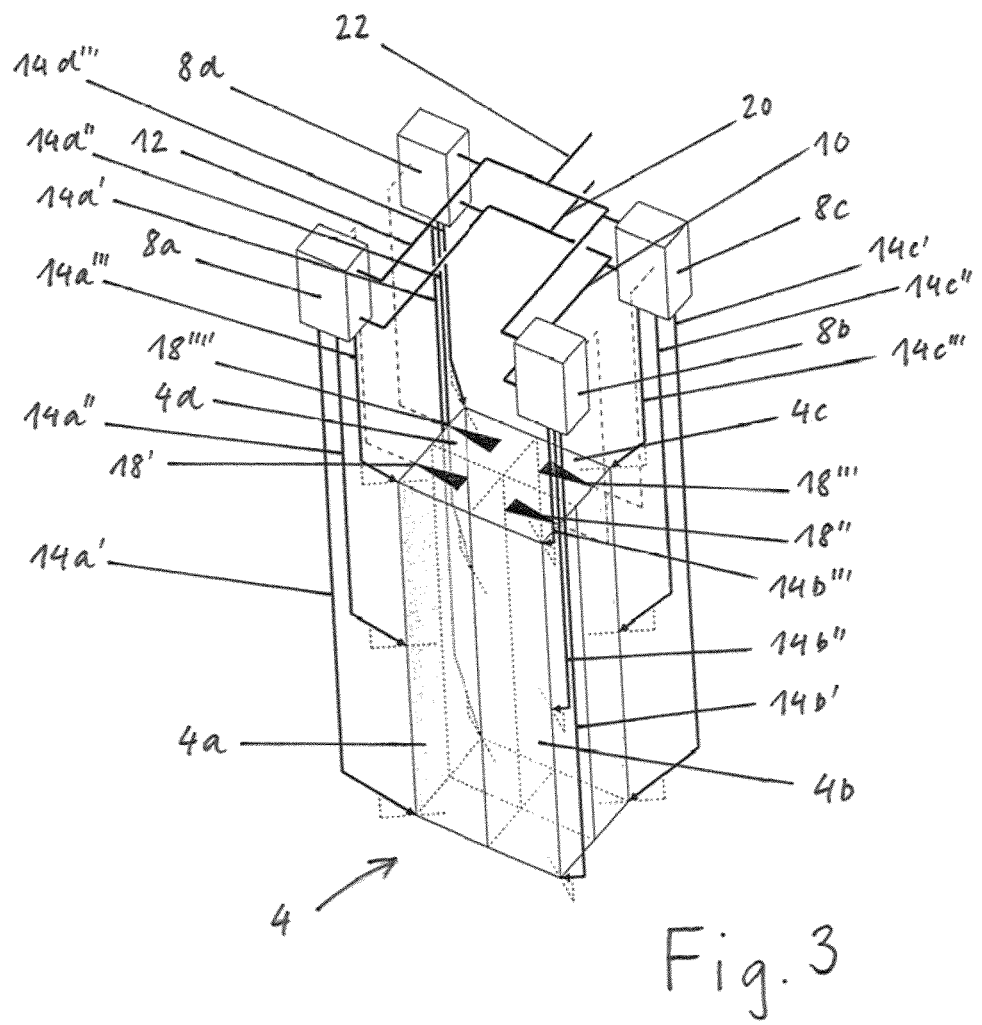

The invention relates, further, to an apparatus for carrying out the method described above. The method and the apparatus are explained further with reference to the accompanying figures in which:

FIG. 1 shows a purely diagrammatic illustration of a boiler sector of an apparatus according to the invention which is assigned to a boiler of a waste incineration plant, the boiler sector comprising overall nine nozzles which can be distributed on three nozzle planes;

FIG. 2 shows a graph in which the respective temperature range (abscissa) is plotted as a function of the boiler height (ordinate) and the resulting area of temperature distribution in the boiler is depicted, overlaid with the optimal temperature range of the SCNR method, illustrated by dark hatching; and FIG. 3 shows a purely diagrammatic illustration of an apparatus according to the invention in which the boiler is subdivided into four vertically extending boiler sectors.

According to FIG. 1, the apparatus 2 is assigned to a boiler 4 of a waste incineration plant, through which incineration flue gas flows. The direction of flow of the flue gas is illustrated in this case by parallel arrows 6.

The boiler 4 comprises a boiler sector 4a, to which a distributor 8 is assigned. The latter has issuing into it a supply line 10 for supplying a substance, in particular a reducing agent for the reduction in nitrogen oxides, and a supply line 12 for supplying a propellant. Overall nine lines 14a-i branch off from the distributor 8, of which three lines 14a, 14b, 14c lead in each case to a nozzle 16a, 16b and 16c of a first horizontal nozzle plane, three lines 14d, 14e, 14f lead in each case to a nozzle 16d, 16e and 16f of a second horizontal nozzle plane with three lines 14g, 14h, 14i lead in each case to a nozzle 16g, 16h and 16i of a third horizontal nozzle plane. In this case, in each case, three nozzles 14a, 14d, 14g and 14b, 14e, 14h and 14c, 14f, 14i respectively are arranged one above the other and therefore in each case in a vertical nozzle plane.

Moreover, the distributor is assigned two temperature measuring apparatuses 18a, 18b, by means of which the temperature profile prevailing in the boiler 4 is determined continuously in two dimensions, as described above.

If the apparatus is used in an SNCR method it is additionally assigned (not shown), as a rule, means for determining the nitrogen oxide content present downstream of the boiler, by which means the overall quantity of the reducing agent to be injected is regulated.

As a function of the temperature profile, the quantity of reducing agent to be conducted to the respective nozzle 16a-i is set in the distributor 2 and is combined with the propellant. The propellant stream containing the metered reducing agent quantity is subsequently conducted via the respective line 14a-i to the nozzle 16a-i at the desired injection point and is injected into the boiler 4 there. The nozzles not acted upon by the reducing agent are cooled by means of a smaller propellant quantity likewise set in the distributor 8.

The reducing agents used in the SNCR method described are preferably ammonia water which is supplied to a propellant stream consisting of air or steam. The distribution of the ammonia water in this case takes place in such a way that it is injected in the temperature range of 850 to 950° C. optimal for the reduction of nitrogen oxides.

This concept is further illustrated in FIG. 2, according to which the temperature distribution of conventional boilers ranges, as a rule, from approximately 1000 to 1100° C. in the lowermost region of the boiler, that is to say at approximately 2 to 4 m above the grate, to approximately 700 to 900° C. in the uppermost region of the boiler, that is to say at approximately 20 to 40 m above the grate. The region overlapping with the optimal temperature range in the SNCR method, illustrated by dark hatching, corresponds to that region of the boiler in which the nozzles distributed on the three horizontal nozzle planes should be in operation for an optimal reduction of the nitrogen oxides.

The position of these horizontal nozzle planes in the boiler is reproduced in FIG. 2 by dashed arrows. In this case, the nozzle planes are arranged at irregular distances from one another. Depending on the boiler, however, a regular arrangement of the nozzle planes may also be envisaged.

The graph for a corresponding boiler thus gives information on the arrangement of the nozzle planes which is to be selected in order to ensure injection in the preferred temperature range.

The boiler 4 being subdivided into a plurality of (virtual) boiler sectors is further shown in FIG. 3. According to FIG. 3, the boiler 4 is subdivided into four vertically extending boiler sectors 4a, 4b, 4c, 4d. To each of the boiler sectors 4a, 4b, 4c, 4d of the embodiment shown in FIG. 3, one separate distributor 8a, 8b, 8c, 8d, respectively, is assigned, and to each distributor 8a, 8b, 8c, 8d, one separate temperature measuring apparatus 18', 18", 18''', 18'''', respectively, is assigned.

Each distributor has issuing into it a supply line 10 for supplying a substance, in particular a reducing agent for the reduction in nitrogen oxides, and a supply line 12 for supplying a propellant. Both the supply line 10 for supplying the substance and the supply line 12 for supplying the propellant are branching off a respective main supply line 20 for the supplying the substance and a main supply line 22 for supplying the propellant, respectively.

From each distributor 8a, 8b, 8c, 8d, three lines 14a', 14a", 14a''', 14b', 14b", 14b''', 14c', 14c", 14c''', 14d', 14d", 14d''', respectively, branch off, leading in each case to a nozzle. In each boiler sector 4a, 4b, 4c, 4d, one nozzle 16 is arranged on each of the three horizontal nozzle planes.

The embodiment shown in FIG. 3 allows for using a relatively simple distributor. Furthermore, the use of a plurality of distributors allows for the use of relatively short lines and thus for a relatively quick adaptation of the desired substance quantity for each injection point.

EXAMPLE

A concrete exemplary embodiment of the metering of ammonia water for an SNCR method is reproduced in table 1. According to this exemplary embodiment, the boiler is subdivided into four boiler sectors, to be precise a boiler sector at back left (HL), a boiler sector at back right (HR), a boiler sector at front left (VL) and a boiler sector at front right (VR). The nozzles are arranged in the boiler sectors on three horizontal nozzle planes.

For each individual boiler sector, the temperature is determined at a predetermined point by means of a radiation pyrometer. By means of multiplication by an appropriate factor indicated in table 1, the temperature of the individual nozzle planes in the boiler sectors can be determined on the basis of the respective measured temperature.

10 kg of ammonia water (25% ammonia solution)/h are injected per boiler sector. The apportionment of the ammonia water to the individual nozzle planes takes place in this case as a function of the calculated temperature profile, specifically in such a way that ammonia water is injected, as the main emphasis, where the temperature range optimal for the reduction of nitrogen oxide is present.

As is clear, further, from Table 1, a propellant/cooling air quantity of 100 kg/h is set for the nozzles acted upon by ammonia water, while, for the nozzles not acted upon by ammonia water, a reduced propellant/cooling air quantity of 50 kg/h is set for cooling the nozzles.

TABLE 1

| | | HL | HR | VL | VR | Total |
|---|---|---|---|---|---|---|
| Radiation pyrometer indication (T) | °C. | 910 | 880 | 850 | 860 | |
| Temperature on 1st plane (calculated 1.11 * T) | °C. | 1010 | 977 | 944 | 955 | |
| Temperature on 2nd plane (calculated 1.04 * T) | °C. | 946 | 915 | 884 | 894 | |
| Temperature on 3rd plane (calculated 0.97 * T) | °C. | 883 | 854 | 825 | 834 | |
| Metering of 25% ammonia water on 1st plane | kg/h | 0.0 | 0.0 | 0.3 | 0.0 | |
| Metering of 25% ammonia water on 2nd plane | kg/h | 0.0 | 1.4 | 9.7 | 7.3 | 40 |
| Metering of 25% ammonia water on 3rd plane | kg/h | 10.0 | 8.6 | 0.0 | 2.7 | |
| Propellant/cooling air on 1st plane | kg/h | 50 | 50 | 100 | 50 | |
| Propellant/cooling air on 2nd plane | kg/h | 50 | 100 | 100 | 100 | 950 |
| Propellant/cooling air on 3rd plane | kg/h | 100 | 100 | 50 | 100 | |

The invention claimed is:

1. A method for injecting a reducing agent for reduction of nitrogen oxides into a boiler of a waste incineration plant, using a gaseous propellant, the reducing agent being conducted, starting from at least one distributor, via lines which branch off from the distributor, in each case to a nozzle which is assigned to a respective line and by which the reducing agent and the propellant are injected into the boiler, and a quantity of the reducing agent to be conducted to a respective nozzle being set individually for each nozzle in the distributor, wherein the boiler is subdivided into multiple boiler sectors, in which the nozzles are arranged in a plurality of horizontal nozzle planes, and to each boiler sector at least one separate distributor is assigned, and the reducing agent and the propellant are combined upstream of a branch-off from the respective line, wherein the quantity of the reducing agent to be conducted to the respective nozzle is regulated as a function of a temperature profile in the boiler, wherein a first propellant quantity is set for the nozzles acted upon by the reducing agent, and a second propellant quantity that is less than the first propellant quantity is set for the nozzles not acted upon by the reducing agent, and wherein, in the nozzles acted upon by the reducing agent, a nozzle admission pressure of approximately 1 to 5 bar is set.

2. The method as claimed in claim 1, wherein, in the event of a change in a setting of the quantity of the reducing agent to be conducted to the respective nozzle, the change is carried out infinitely variably.

3. The method as claimed in claim 1, wherein the reducing agent is one of ammonia and urea.

4. The method as claimed in claim 3, wherein an overall quantity of the reducing agent to be injected is regulated as a function of a content of the nitrogen oxides present downstream of the boiler in flue gas.

5. The method as claimed in claim 1, wherein the temperature profile in the boiler is determined by at least two temperature measuring apparatuses.

6. The method as claimed in claim 5, wherein the temperature measuring apparatuses used are radiation pyrometers.

7. The method as claimed in claim 1, wherein the propellant used is one of air and steam.

8. The method as claimed in claim 1, wherein the boiler sectors extend vertically.

9. The method as claimed in claim 1, wherein, in each boiler sector, one nozzle is arranged on each horizontal nozzle plane.

10. The method as claimed in claim 1, wherein one distributor is assigned to each boiler sector.

11. The method as claimed in claim 1, wherein the boiler is subdivided into four boiler sectors.

12. The method as claimed in claim 1, wherein the nozzles are arranged on three horizontal nozzle planes.

13. An apparatus for carrying out the method as claimed in claim 1, comprising at least one distributor, from which lines branch off which lines lead in each case to a nozzle for injecting the reducing agent and the propellant into the boiler, the distributor being assigned means for setting a quantity of the reducing agent to be conducted to the respective nozzle, and the apparatus further comprises means for combining the reducing agent and the propellant upstream of the branch-off of the respective line from the distributor.

* * * * *